(12) United States Patent
Knevels

(10) Patent No.: US 8,371,562 B2
(45) Date of Patent: Feb. 12, 2013

(54) DOUBLE PATH MOUNT FOR CAB SUSPENSION WITH TILTING FUNCTION

(75) Inventor: Luc Knevels, Houthalen-Helchteren (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 285 days.

(21) Appl. No.: 12/772,446

(22) Filed: May 3, 2010

(65) Prior Publication Data
US 2011/0266727 A1 Nov. 3, 2011

(51) Int. Cl.
*F16F 9/04* (2006.01)
(52) U.S. Cl. .................. 267/64.27; 267/64.13
(58) Field of Classification Search .......... 267/64.13, 267/64.19, 64.23, 64.24, 64.27, 140.11, 35; 180/902; 296/190.07, 1.03, 65.02; 188/321.11
See application file for complete search history.

(56) References Cited

U.S. PATENT DOCUMENTS

| | | | |
|---|---|---|---|
| 4,391,436 A * | 7/1983 | Fishbaugh | 267/141.1 |
| 5,590,733 A * | 1/1997 | Ljungholm et al. | 180/89.14 |
| 5,632,471 A * | 5/1997 | Pradel | 267/64.11 |
| 5,649,692 A | 7/1997 | Gilsdorf et al. | |
| 6,073,714 A | 6/2000 | McHorse et al. | |
| 6,540,038 B2 | 4/2003 | Taylor et al. | |
| 6,598,932 B2 | 7/2003 | Gross et al. | |
| 6,726,272 B1 | 4/2004 | Puterbaugh et al. | |
| 7,175,165 B1 | 2/2007 | Vande Brake et al. | |
| 7,232,180 B2 | 6/2007 | Biasiotto et al. | |
| 2006/0208404 A1 * | 9/2006 | Cmich et al. | 267/64.27 |

FOREIGN PATENT DOCUMENTS

| | | |
|---|---|---|
| EP | 1 724 186 | 11/2006 |
| JP | 60056612 A * | 4/1985 |
| JP | 2006-315435 | 11/2006 |
| KR | 10-2004-033455 | 4/2004 |

OTHER PUBLICATIONS

Search Report and Written Opinion dated Dec. 26, 2011 from corresponding PCT Application No. PCT/US2011/032830.

* cited by examiner

*Primary Examiner* — Robert A Siconolfi
*Assistant Examiner* — Anna Momper
(74) *Attorney, Agent, or Firm* — Harness, Dickey & Pierce, P.L.C.

(57) ABSTRACT

A cab mounting assembly attaches a cab to a chassis of a vehicle at the point of rotation of the cab when the cab is tilted. The cab mounting assembly provides two paths for the forces acting between the cab and the chassis. The static forces are supported by a bearing assembly which includes a relatively hard elastomeric member. The dynamic forces are supported by an elastomeric mount which includes a relatively soft elastomeric member. The elastomeric mount is attached to the bearing assembly and to a shock absorber. The bearing assembly is attached to the elastomeric mount and to an air spring assembly.

13 Claims, 3 Drawing Sheets

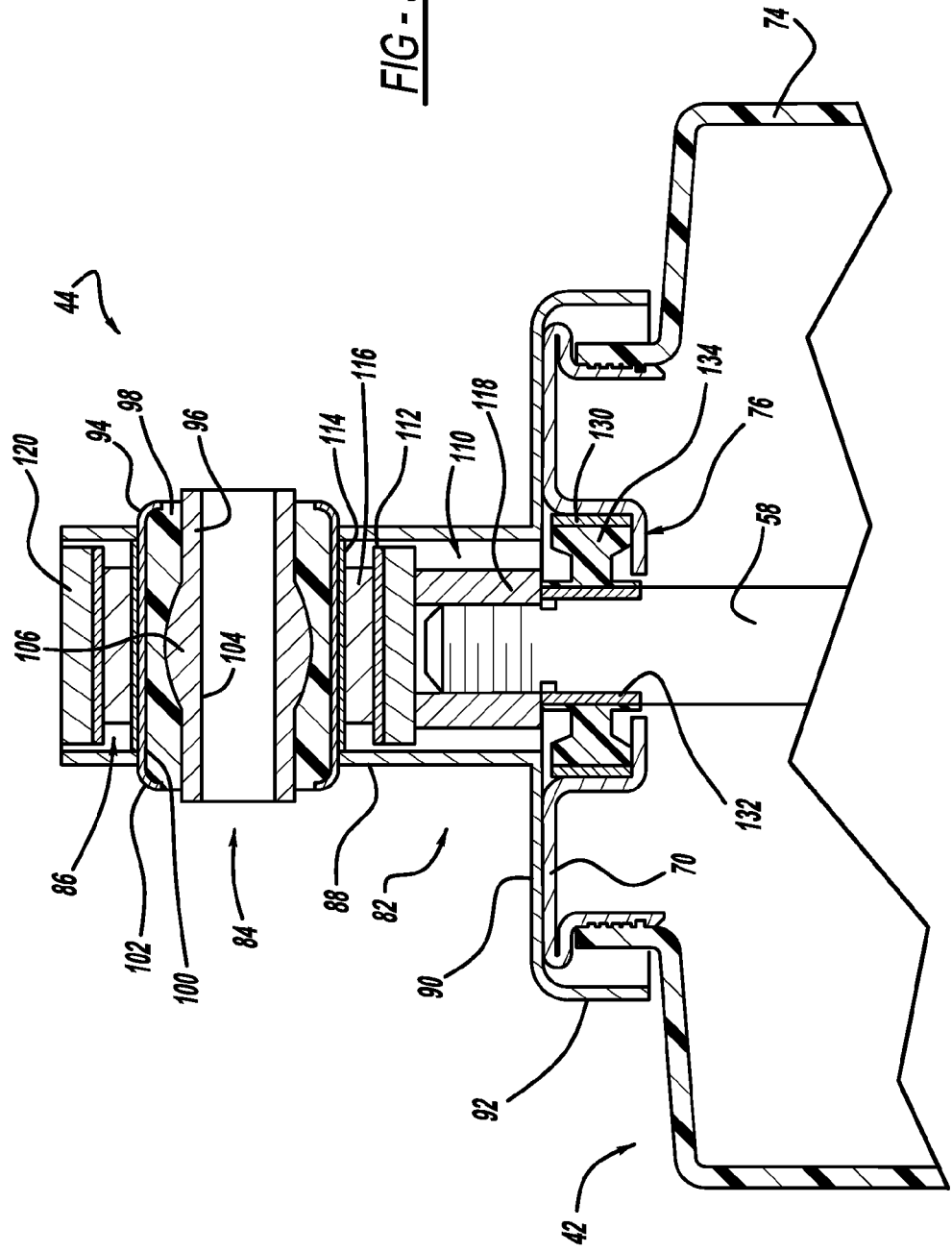

DOUBLE PATH MOUNT FOR CAB SUSPENSION WITH TILTING FUNCTION

FIELD

The present disclosure relates to a cab suspension system typically used in large trucks and other vehicles. More particularly, the present disclosure relates to a mount located at the tilting point of the cab which includes a double path mounting system for isolating the cab.

BACKGROUND

This section provides background information related to the present disclosure which is not necessarily prior art.

In order to provide comfort for large vehicle operators and reduce driving fatigue experienced by operators of larger vehicles, the operator's cab is suspended utilizing a vibration isolation device and a shock absorption device between the vehicle's chassis and the vehicle's cab which reduces the shock, vibration and consequent pounding the operator experiences during operation of the vehicle. Additionally, the continued application of vibration and shock forces to the cab results in structural damage which ultimately increases the costs associated with maintenance.

The load carried by a large vehicle is supported by the vehicle's frame which is resiliently carried by the vehicle's suspension springs and the vehicle's shock absorbers supported by the vehicle's wheels. Suspension springs typically have a high rate of stiffness which makes the ride more jarring on the operator of the vehicle. To dampen the vibration and shock transmitted to the cab, cab suspension systems have been developed utilizing cab mounting systems that include cab hydraulic shock absorbers and cab air springs to reduce the jounce and rebound movements of the cab with respect to the vehicle's frame.

These cab hydraulic shock absorbers and cab air springs can be mounted at both the front and rear ends of the cab. Typically, a cab is tilted by rotating around a pair of cab air springs and cab hydraulic shock absorbers which are located at the front of the vehicle. The front mounting cab hydraulic shock absorbers and cab air springs often need some type of a bearing to enable the rotational movement during the tilting of the cab. This rotational movement requirement makes it difficult from a design point of view to adequately isolate the cab from the frame.

SUMMARY

This section provides a general summary of the disclosure, and is not a comprehensive disclosure of its full scope or all of its features.

The present disclosure provides a cab mounting assembly which is designed for the mounting of the cab at the position where the cab rotates when it tilts. The cab mounting assembly of the present disclosure provides a double path for the loading on the cab mounting assembly such that the dynamic load is uncoupled from the static load. This uncoupling of the two loads allows for the design optimization of both paths to optimally isolate both the static loading and the dynamic loading.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
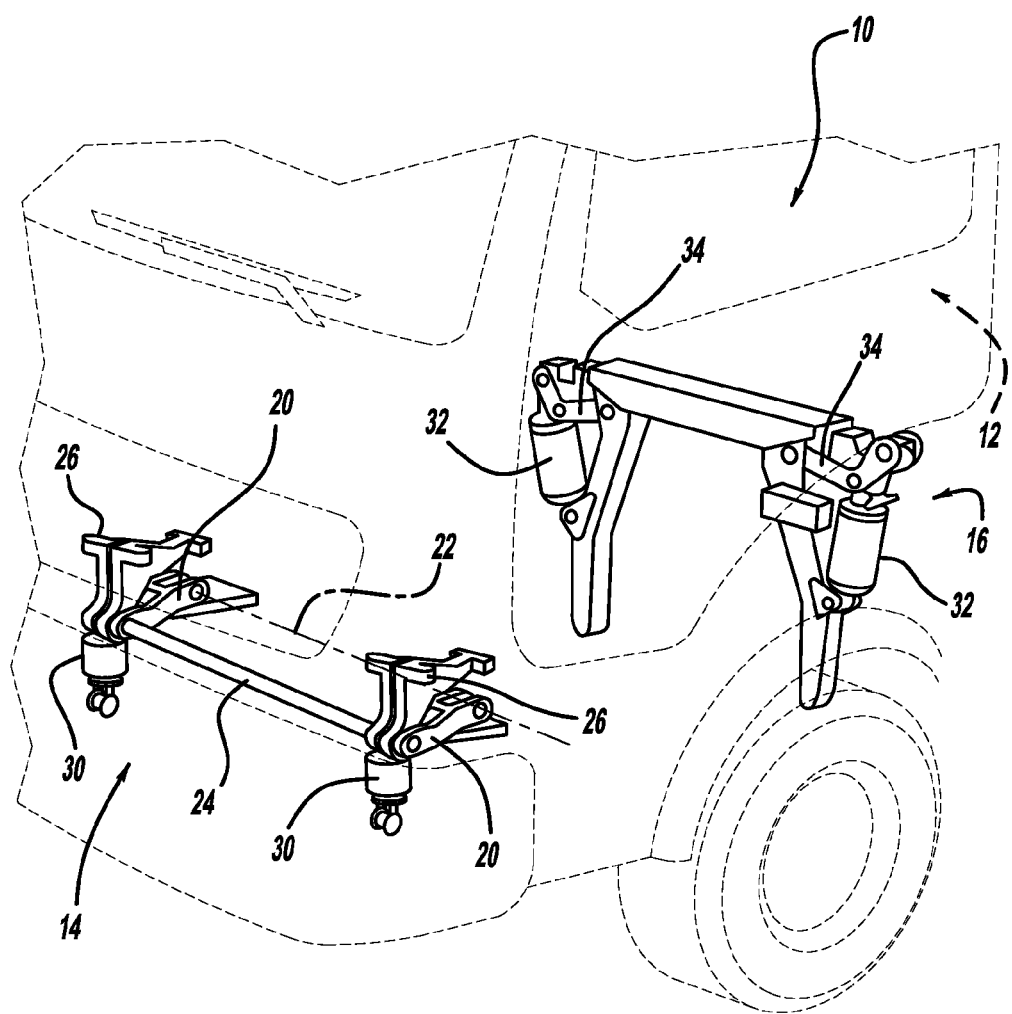
FIG. 1 is a side elevation view of a truck incorporating the cab mounting assembly in accordance with the present disclosure.

Referring now to the figures where like reference numerals designate like or similar components in the various views, there is illustrated in FIG. 1 a vehicle which incorporates the cab mounting assembly in accordance with the present disclosure and which is designated generally by the reference numeral 10. Vehicle 10 comprises a cab 12, a front suspension 14 and a rear suspension 16.

Front suspension 14 comprises a pair of longitudinal oscillating arms 20 mounted to oscillate about a common transverse axis 22 generally perpendicular to a vertical longitudinal plane of vehicle 10. The free ends of oscillating arms 20 are connected to a transverse torsion bar 24. A pair of supports 26 are rotatably mounted on torsion bar 24. Supports 26 are rigidly connected to the structure of cab 12 allowing cab 12 to rotate about the axis of torsion bar 24. This allows the raising of cab 12 by means of rotating about the axis of torsion bar 24 when it is necessary to gain access to an engine set underneath cab 12 for maintenance operations. A pair of cab mounting assemblies 30 are disposed between the free ends of oscillating arms 20 and the chassis of vehicle 10. Rear suspension 16 comprises a pair of spring damper assemblies 32 which are attached to the chassis of vehicle 10 and to cab 12 through a pair of oscillating arms 34.

Figure 2:
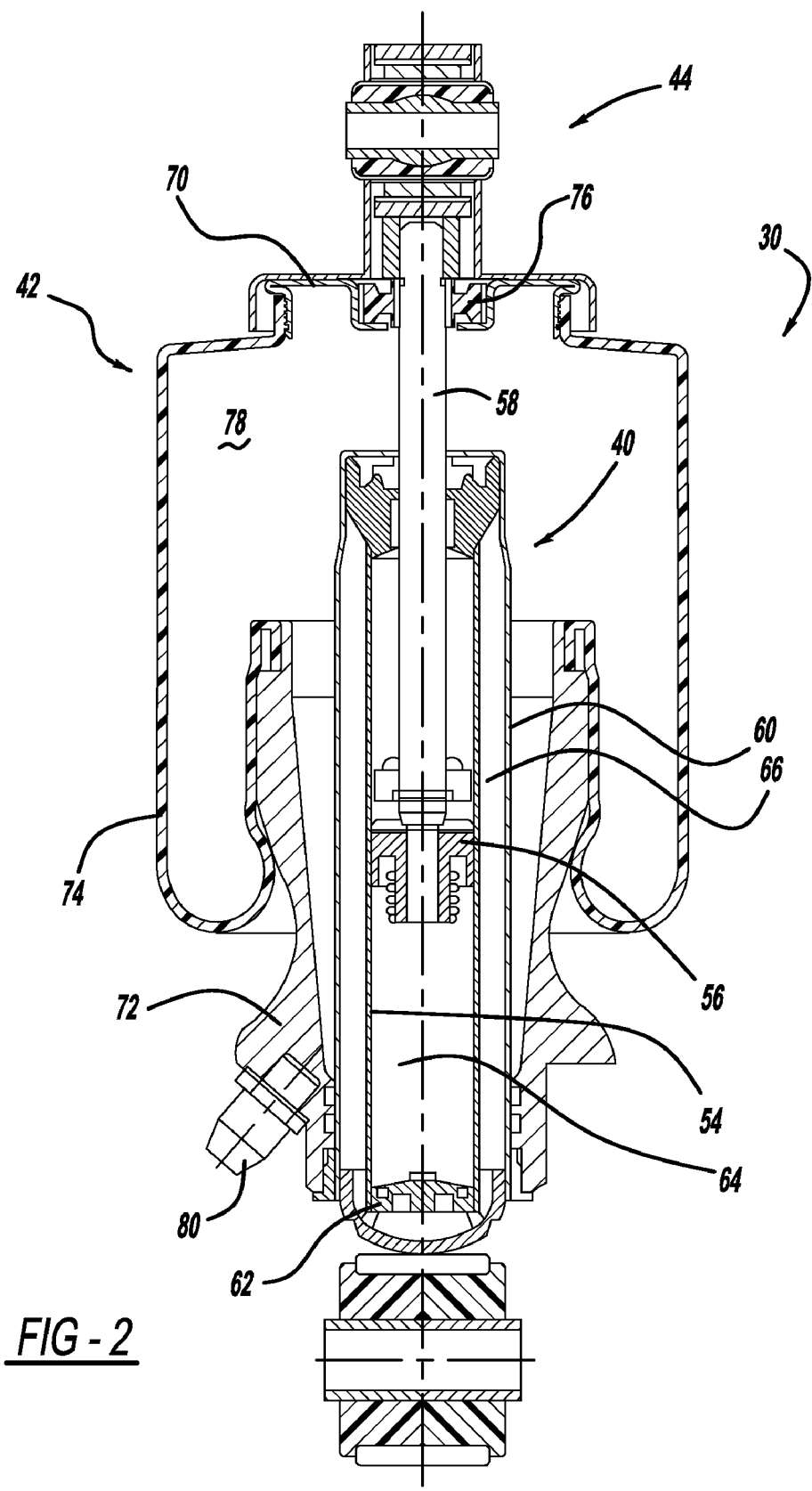
FIG. 2 is a side cross-sectional view of one of the cab mounting assemblies illustrated in FIG. 1; and, FIG. 3 is an enlarged side view of the double path mounting system illustrated in FIG. 2.

Referring now to FIG. 2, cab mounting assembly 30 is illustrated in greater detail. Cab mounting assembly 30 comprises a shock absorber 40, an air spring assembly 42 and a double path top mount 44. Shock absorber 40 is a dual-tube shock absorber which comprises a pressure tube 54, a piston assembly 56, a piston rod 58, a reserve tube 60 and a base valve assembly 62.

Pressure tube 54 defines a working chamber 64. Piston assembly 56 slidingly engages pressure tube 54 and is disposed within working chamber 64. Piston rod 58 is adapted to be attached to piston assembly 56 and it extends out of working chamber 64 through one end of pressure tube 54 and air spring assembly 42 to be attached to double path top mount 44 which is attached to cab 12. Reserve tube 60 surrounds pressure tube 54 to define a reserve chamber 66. Base valve assembly 62 is attached to pressure tube 54 to control fluid flow between working chamber 64 and reserve chamber 66. The end of reserve tube 60 opposite to piston rod 58 is adapted to be attached to the chassis of vehicle 10.

Because piston rod 58 only extends through one portion of working chamber 64, movement of piston assembly 56 causes a different amount of fluid flow in the portion of working chamber 64 above and below piston assembly 56. This difference in fluid flow is known as the "rod volume" and it flows through base valve assembly 62. During a compression movement, fluid will flow from below piston assembly 56 to above piston assembly 56 through valving in piston assembly 56. The "rod volume" of fluid will flow from working chamber 64 through valving in base valve assembly 62 and into reserve chamber 66. The flow of fluid through the valving in base valve assembly 62 during a compression stroke defines the damping characteristics for shock absorber 40. During an extension stroke, fluid will flow from above piston assembly 56 to below piston assembly 56 through valving in piston assembly 56. The "rod volume" of fluid will flow from reserve chamber 66 through valving in base valve assembly 62 and into working chamber 64. The flow of fluid through the valving in piston assembly 56 during an extension stroke will determine the damping characteristics for shock absorber 40.

Air spring assembly 42 comprises an upper mount 70, a lower mount 72 and a spring sleeve 74. Upper mount 70 mates with double path top mount 44. Upper mount 70 sealingly mates with piston rod 58 of shock absorber 40. A dynamic air seal 76 seals the interface between air spring assembly 42 and piston rod 58 of shock absorber 40. Lower mount 72 is sealingly attached to shock absorber 40 and acts as a piston for air spring assembly 42. Spring sleeve 74 sealingly engages upper mount 70 and lower mount 72 to define a sealed chamber 78. An inlet 80 extends through lower mount 72 and is utilized to insert pressurized fluid, preferably air into sealed chamber 78.

Referring now to FIG. 3, double path top mount 44 comprises a bracket 82, a bearing assembly 84, and an elastomeric mount 86. Bracket 82 is secured to and interfaces with upper mount 70 of air spring assembly 42. Bracket 82 comprises an upright portion 88 which interfaces with bearing assembly 84, an annular portion 90 extending generally perpendicular to upright portion 88 and which interfaces with upper mount 70 of air spring assembly 42 and an annular portion 92 extending generally perpendicular to annular portion 90 and which extends around upper mount 70 of air spring assembly 42.

Bearing assembly 84 comprises an outer metal 94, an inner metal 96 and an elastomeric member 98 disposed between outer metal 94 and inner metal 96. Outer metal 94 is attached to upright portion 88 of bracket 82 by being press fit into a pair of holes 100 defines by upright portion 88 of bracket 82. While outer metal 94 is illustrated as being press fit into holes 100 of upright portion 88, outer metal 94 can be attached to upright portion 88 by any other means known in the art. The ends of outer metal 94 are rolled over as illustrated at 102 to encapsulate elastomeric member 98. Inner metal 96 is illustrated as a tubular member defining a through hole 104 and an arcuate center section 106. While inner metal 96 is illustrated having through hole 104 and arcuate central section 106, other inner metal configurations known in the art can be utilized in bearing assembly 84. Through hole 104 accepts a fastener which secures double path top mount 44 to cab 12. The interface between inner metal 96 and elastomeric member 98 defines a bearing which allows elastomeric member 98 to rotate around inner metal 96 to allow for the tilting of cab 12. Elastomeric member 98 can be manufactured from a self lubricating elastomer to provide for the rotation of elastomeric member 98 around inner metal 96. Other alternatives for elastomeric member 98 include, but are not limited to, a plastic bearing bushing or a DU bushing. Elastomeric member 98 is preferably manufactured from a relatively hard elastomeric material in order to enable it to withstand and isolate the static and dynamic loading applied to dual path top mount 44.

Elastomeric mount 86 comprises a piston rod mount 110, an outer metal 112, an inner metal 114 and an elastomeric member 116 disposed between outer metal 112 and inner metal 114. Piston rod mount 110 comprises a piston rod interface 118 which is threadingly received on piston rod 58 or otherwise attached to piston rod 58 and an annular ring 120 which is attached to piston rod interface 118. Outer metal 112 is attached to annular ring 120 by being press fit or otherwise secured within annular ring 120. Inner metal 114 is a tubular member which is press fit over or otherwise secured to outer metal 94 of bearing assembly 84. Elastomeric member 116 is disposed between outer metal 112 and inner metal 114. Elastomeric member 116 is only loaded by the dynamic loads and therefore it can be manufactured from a relatively soft elastomeric material to provide improved Noise Vibration and Harshness (NVH) characteristics as opposed to the harder elastomeric material of elastomeric member 98 of bearing assembly 84.

During operation, the static loads are transferred through bearing assembly 84 to bracket 82 and then to air spring assembly 42. The relatively hard elastomeric material for elastomeric member 98 of bearing assembly 84 transfers the static loading between bearing assembly 84 and bracket 82. The dynamic (damping) forces are transferred by piston rod 58, through dynamic air seal 76 and through elastomeric mount 86 to bearing assembly 84. The relative soft elastomeric material for elastomeric member 116 provides improved NVH characteristics for the dynamic loading and creates a barrier for the high frequency vibrations.

Dynamic air seal 76 allows for the movement of piston rod 58 of shock absorber 40 with respect to upper mount 70 of air spring assembly 42. Dynamic air seal 76 comprises a rigid outer member 130, a rigid inner member 132 and an elastomeric member 134 disposed between rigid outer member 130 and rigid inner member 132. Dynamic air seal 76 provides a seal for sealed chamber 78 as well as allowing for the movement of piston rod 58 separate from upper mount 70 of air spring assembly 42 to permit the proper isolation by elastomeric mount 86.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A cab mounting assembly for a vehicle, the cab mounting assembly comprising:
   a shock absorber having a pressure tube and a piston rod movable in an axial direction with respect to said pressure tube;
   an air spring assembly attached to said shock absorber; and
   a double path top mount attached to both said shock absorber and said air spring assembly, said double path top mount comprising:
   a bearing assembly attached to said air spring assembly, said bearing assembly including a cylindrical first inner metal adapted to be attached to a cab of the vehicle, a first cylindrical outer metal fixedly attached to said air spring assembly and surrounding said first inner metal and a first cylindrical elastomeric member disposed between said first cylindrical outer metal and said first cylindrical inner metal, said first cylindrical elastomeric member having a first hardness;

an elastomeric mount disposed between said bearing assembly and said shock absorber, said elastomeric mount including a second cylindrical inner metal surrounding and directly engaging said first cylindrical outer metal of said bearing assembly, a second cylindrical outer metal surrounding said second cylindrical inner metal and fixedly attached to said shock absorber and a second cylindrical elastomeric member disposed between said second cylindrical outer metal and said second cylindrical inner metal, said second cylindrical elastomeric member having a second hardness; and a dynamic air seal sealing a chamber of said air spring assembly, said dynamic air seal having a rigid inner member secured to said shock absorber, a rigid outer member secured to said air spring assembly and an elastomeric member separate from said elastomeric mount disposed between said rigid inner member and said rigid outer member; movement of said piston rod of shock absorber in the axial direction with respect to said air spring assembly being allowed by said elastomeric member; wherein said second cylindrical elastomeric member deflects in a radial direction when said piston rod moves in said first axial direction; and deflection of said second elastomeric member is independent from deflection of said first elastomeric member.

2. The cab mounting assembly according to claim 1, wherein said double path top mount further comprises a bracket disposed between said bearing assembly and said air spring assembly.

3. The cab mounting assembly according to claim 2, wherein said bracket directly engages said bearing assembly and directly engages said air spring assembly.

4. The cab mounting assembly according to claim 1, wherein said double path top mount further comprises a bracket disposed between said first cylindrical outer metal and said air spring assembly.

5. The cab mounting assembly according to claim 4, wherein said bracket directly engages said first cylindrical outer metal and directly engages said air spring assembly.

6. The cab mounting assembly according to claim 1, wherein said second hardness is softer than said first hardness.

7. The cab mounting assembly according to claim 1, wherein said air spring assembly is attached to an outer tube of said shock absorber and said second outer metal is attached to a piston rod of said shock absorber.

8. The cab mounting assembly according to claim 1, wherein said first cylindrical inner metal and said second cylindrical inner member are co-axial with respect to an axis generally perpendicular to said axial direction of movement of said piston rod.

9. The cab mounting assembly according to claim 1, wherein said bearing assembly and said elastomeric mount are co-axial with respect to an axis generally perpendicular to said axial direction of movement of said piston rod.

10. The cab mounting assembly according to claim 1, wherein said first cylindrical inner metal defines a first axis generally perpendicular to said axial direction of movement of said piston rod.

11. The cab mounting assembly according to claim 10, wherein said second cylindrical outer metal defines a second axis generally perpendicular to said axial direction of movement of said piston rod.

12. The cab mounting assembly according to claim 11, wherein the first and second axes are co-axial.

13. The cab mounting assembly according to claim 1, wherein said first and second inner metal, said first and second outer metal and said first and second elastomeric member are all co-axial with respect to an axis generally perpendicular to said axial direction of movement of said piston rod.

* * * * *